(12) United States Patent
Vancraeynest

(10) Patent No.: US 6,863,610 B2
(45) Date of Patent: Mar. 8, 2005

(54) WIRELESS GAMING SYSTEM USING STANDARD CELLULAR TELEPHONES

(75) Inventor: Jan Vancraeynest, Pound Ridge, NY (US)

(73) Assignee: UTStarcom, Inc., Alameda, CA (US)

( * ) Notice: Subject to any disclaimer, the term of this patent is extended or adjusted under 35 U.S.C. 154(b) by 170 days.

(21) Appl. No.: 10/119,448

(22) Filed: Apr. 9, 2002

(65) Prior Publication Data

US 2003/0190956 A1 Oct. 9, 2003

(51) Int. Cl.[7] .................................................. A63F 9/24

(52) U.S. Cl. ........................................ 463/41; 379/93.13

(58) Field of Search ............................... 434/16, 20–22, 434/27; 273/311, 313; 463/1–2, 5, 7, 49–57, 40–42; 379/67.1, 88.12, 90.01, 93.13; 455/414.4; 340/323 R

(56) References Cited

U.S. PATENT DOCUMENTS

| | | | |
|---|---|---|---|
| 5,738,583 A | 4/1998 | Comas et al. | 463/40 |
| 5,999,808 A | 12/1999 | LaDue | 455/412 |
| 6,530,841 B2 * | 3/2003 | Bull et al. | 463/42 |
| 6,561,809 B1 * | 5/2003 | Lynch et al. | 434/16 |
| 2002/0111201 A1 * | 8/2002 | Lang | 463/2 |

* cited by examiner

Primary Examiner—Mark Sager
(74) Attorney, Agent, or Firm—Clalloc A. S. Hamrick; Felix L. Fischer

(57) ABSTRACT

A method for providing interactive wireless gaming using standard wireless communication devices comprising; receiving a target identity and a delivery location for a game related action from a first game subscriber, wherein the target identity corresponds to a second game subscriber; determining an actual location of the second game subscriber; comparing the actual location of the second game subscriber to the delivery location; and performing game related actions based on the comparison.

13 Claims, 3 Drawing Sheets

WIRELESS GAMING SYSTEM USING STANDARD CELLULAR TELEPHONES

TECHNICAL FIELD

The present invention relates generally to wireless telephone networks and more specifically to wireless gaming on a wireless telephone network.

BACKGROUND ART

The expanding network of digital cellular and personal communication devices (PCS), has created a solid foundation for providing various wireless services. Presently, wireless services are limited to basic telephone services, Short Message Service (SMS), paging, and Internet services. SMS is already available to most subscribers of cellular phones. As cellular phones become ubiquitous, and their processing power and memory increases, additional features are being added to the wireless telephones.

Some systems have added gaming capabilities to wireless telephones. However, most of these systems do not include interactive wireless capabilities. Currently, there are only a few systems that have attempted to implement interactive wireless gaming. One such system is described in U.S. Pat. No. 5,738,583 to Nelson R. Comas. However, the system of the '583 Patent requires special hardware to implement the invention described in the patent. Similarly, the U.S. Pat. No. 5,999,808 to Christoph Karl LaDue, requires special hardware for "transmitting application specific messages over a cellular radio system control channels and switches."

Accordingly, what is needed are improved systems, apparatus, and methods for allowing interactive wireless gaming using existing wireless telephone devices, without the need for any specialized hardware.

DISCLOSURE OF INVENTION

Accordingly, it is an object of the present invention to provide an interactive wireless gaming system using existing digital cellular telephone devices.

Another object of the invention is to provide a method of playing interactive games on an existing wireless digital cellular telephone network.

Still another object of the invention is to provide a wireless gaming system wherein the interactions between subscribers and the system are facilitated using currently available short message services.

Yet another object of the invention is to provide a wireless gaming system wherein a plurality of games may be performed by providing a target location and optionally, a target identity, delivery time, range of impact, etc.

Briefly, one embodiment of the present invention is a method for providing interactive wireless gaming using standard wireless communication devices comprising; receiving a target identity and a delivery location for a game related action from a first game subscriber, wherein the target identity corresponds to a second game subscriber or group of said second game subscribers; determining an actual location of the second game subscriber; comparing the actual location of the second game subscriber to the delivery location; and performing game related actions based on the comparison.

Another embodiment of the present invention is a wireless gaming system for providing interactive wireless gaming using standard wireless communication devices comprising; a wireless communication network providing wireless communications between a plurality of wireless gaming subscribers; a short message service center for processing short messages over the wireless gaming network; a wireless gaming center for performing game related functions, wherein the wireless gaming center interacts with the wireless gaming system through short messages; and a location service center for providing game subscriber locations to the wireless gaming center.

A further embodiment of the present invention is an apparatus for providing interactive wireless gaming using standard wireless communication devices comprising; means for receiving a target identity and a delivery location for a game related action from a first game subscriber, wherein the target identity corresponds to a second game subscriber; means for determining an actual location of the second game subscriber; means for comparing the actual location of the second game subscriber to the delivery location; and means for performing game related actions based on the comparison results.

An advantage of the present invention is that it provides a wireless gaming system that is easily implemented on the existing wireless networks providing short message services and location services.

Another advantage of the present invention is that it may be implemented using existing wireless devices without requiring additional features or hardware.

These and other objects, purposes and advantages of the present invention will become apparent to those skilled in the art in view of the following detailed description of the best presently known mode of carrying out the invention and the industrial applicability of the preferred embodiment as described herein and as illustrated in the several figures of the drawings.

BEST MODE FOR CARRYING OUT THE INVENTION

Figure 1:
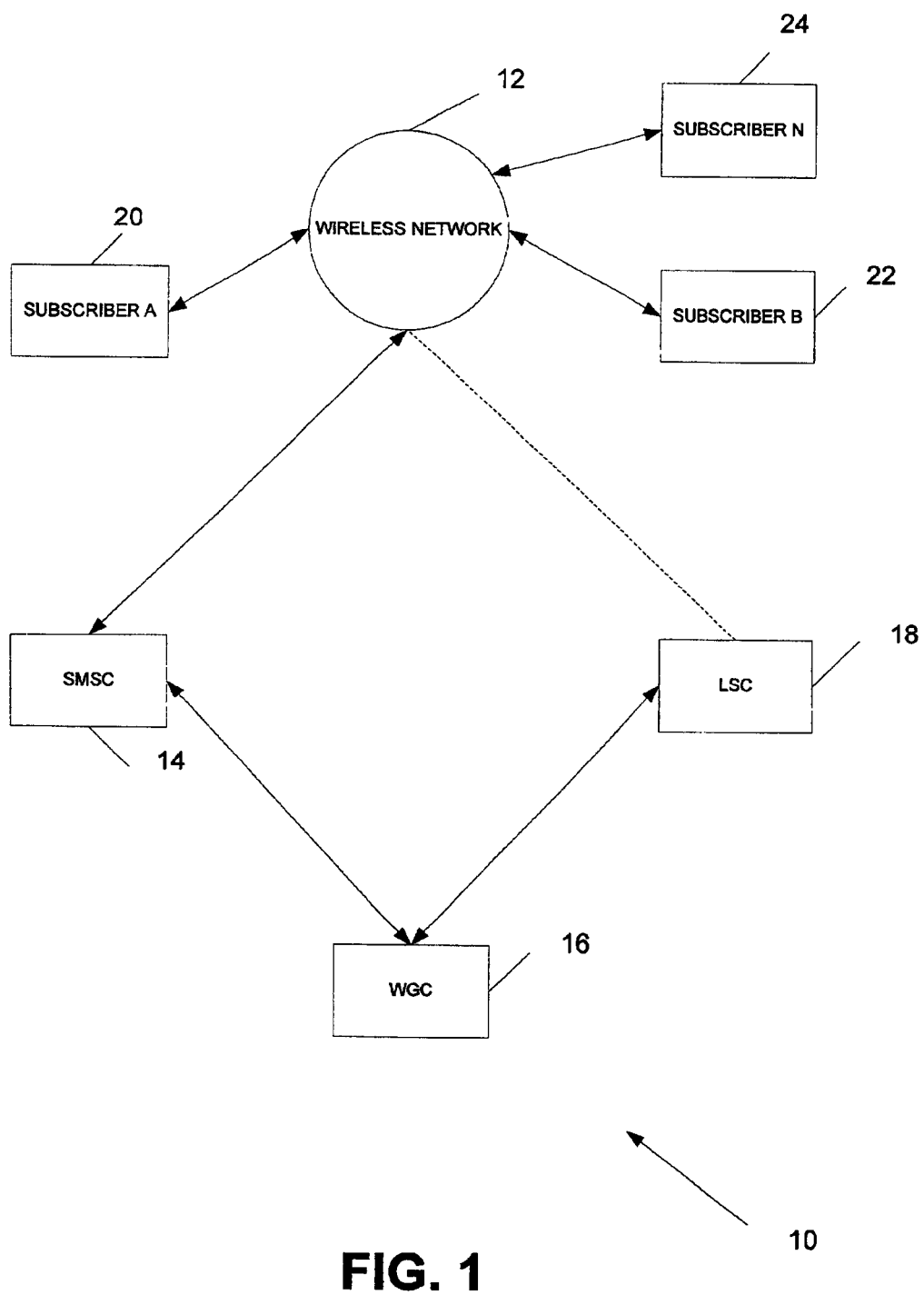
FIG. 1 is a block diagram schematically illustrating the functional components of a wireless gaming system according to one embodiment of the present invention.

FIG. 1 illustrates one embodiment of the present invention in the form of a wireless gaming system providing a paradigm for implementing popular "shoot 'em up" types of games. As identified by the general reference character 10, the system includes a wireless network 12, a short message service center (SMSC) 14, a wireless gaming center (WGC) 16, a location service center (LSC) 18, and a plurality of wireless gaming subscribers illustrated herein at 20-24 and identified as subscriber A, and subscriber B through subscriber N.

The wireless network 12 may be a mobile communication system providing communication between a plurality of mobile subscribers as well as between the mobile subscribers and a land line public switching telephone network (PSTN). The network 12 illustrated in the present example is a prior art system well known to one skilled in the art.

The SMSC 14 is also a prior art system capable of providing means of communication by short messages.

Short message service (SMS) is the service that enables one to send and receive text messages to and from mobile telephones. The text can be comprised of words or numbers, or an alphanumeric combination. In the present example, the basic system requirement for wireless gaming includes the SMS services. Subscribers may participate in the game by sending and receiving game related messages and information using any short message service. Once the SMSC 14 receives a short message from a subscriber, it may direct the SM to the WGC 16, based on the destination telephone number coupled to or included with the message, that is associated with the WGC 26. In this manner, the gaming system of the present invention may be backward compatible with the existing wireless cellular systems. The WGC 16 may communicate with the SMSC 14 or the LSC 18 through the wireless network 12, or another communication mean such as a ground based Ethernet network.

The WGC 16 is the central processing and control system for processing game related messages and activities. WGC 16 receives game related messages from the SMSC 14 and initiates game related actions based on the received game related activities. The messages forwarded by the SMSC 14 to the WGC 16 may be comprised of multiple components including a delivery location, a target identity corresponding to a second game subscriber to be attacked, a delivery time, the type of weapons to be used, the range of the given weapon, etc. It should be apparent to one skilled in the art that game related activities vary based on the type of games played and may include such operations as registering hits, maintaining scores, maintaining an active list of participating game subscribers in a given gaming session, notifying of individual subscribers of the score, etc. At the initiation of a game, the subscriber message received by the WGC 16 may further include the subscriber's login identification, the name of game the subscriber would like to join in or initiate or resume, game specific parameters such as the difficulty level, or other information necessary to initiate a game or join an ongoing game.

The WGC 16 may be implemented by a combination hardware and software solution. Furthermore, WGC 16 may physically reside on the same hardware system as the SMSC 14 or it may be implemented on a physically separate system. Messages generated by the game subscribers 20–24 may be directed to the WGC 16. Therefore, one implementation of the WGC 16 includes a separate telephone number associated with the WGC 16, whereby the subscribers transmit game related messages. The WGC 16 breaks the SM directed to it into its respective components and decodes the game specific components of it. Based on the content of the decoded SM, WGC 16 queries the location service center 18.

The location service center (LSC) 18 responds to the WGC 16 queries, and obtains the current location of a particular game subscriber that is the subject of a game related action. The LSC 18 may be in communication with the wireless network 12, and may obtain the physical location of a particular gaming subscriber based on the location information contained in the home location register (HLR) and visited location register (VLR) of the wireless network system 12. The LSC 18 may further pin point the precise location of a particular subscriber within a given cell site, by various methods known to those skilled in the art, such as triangulation based on signal strength or time-of-arrival measurements between several fixed wireless access points to the wireless network.

As indicated above, the plurality of mobile subscribers communicating using the wireless network 12 may also be gaming subscribers. The system of the present invention is compatible with the current communication systems, and can be implemented using the presently available wireless devices capable of sending and receiving short messages.

Each gaming subscriber interacts with other subscribers by sending game related information through the wireless network 12. For example, if subscriber A wants to interact with subscriber B, using his wireless device, subscriber A may transmit a game related message to the subscriber B just as if he was sending a regular short message. The game related message is first received and processed by the SMSC 14, and then forwarded to the WGC 16. As previously indicated, WGC 16 may have a specific telephone number assigned to it. So, when sending a game related message, the subscriber may formulate his game related message with a short message recipient telephone number corresponding to the number assigned to WGC 16. Once the WGC 16 receives the message, it in turn decodes the game related message and determines the ultimate recipient or "target" of the game related message. Similarly, other gaming subscribers would interact with subscriber A and each other through the wireless network 12, the SMSC 14 and WGC 16.

Figure 2:
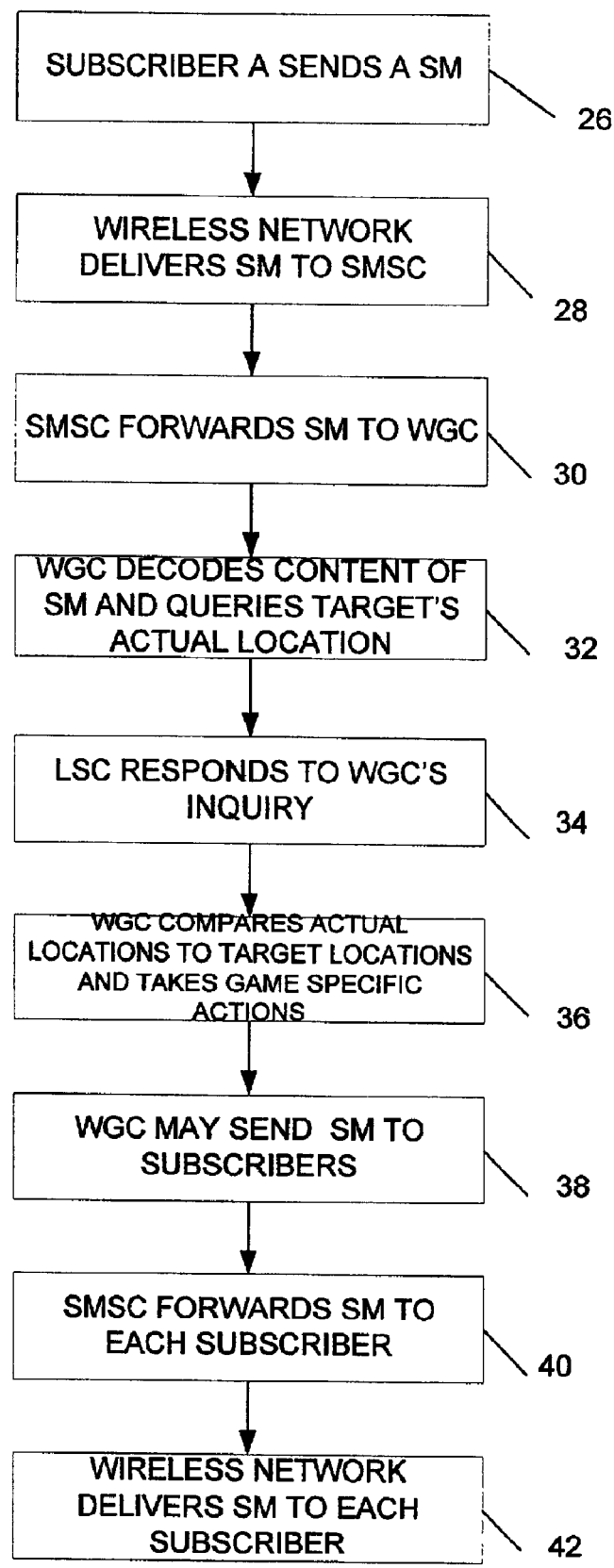
FIG. 2 is a flow chart illustrating operation of the embodiment of FIG. 1.

FIG. 2 is a flow chart illustrating operation of the embodiment of FIG. 1. In order to better explain the operation of the present invention, a "shoot 'em up" type interactive game is described in the exemplary embodiment described herein below. However, it will be apparent to one skilled in the art that a variety of gaming alternatives may be implemented using the system and method of the present invention and the disclosure is not to be considered as limiting.

In block 26, of this exemplary embodiment, a subscriber such as subscriber A may interact with the gaming system and other subscribers by initially sending a short message (SM) through the wireless network 12 described above with respect to FIG. 1.

As indicated by block 28, the wireless game network 12 delivers the SM to the SMSC 14. The destination address of this SM is ADDR-W, the pre-provisioned address (telephone number assigned to WGC 16) of the WGC 16. In the current example, the SM may be addressed to a recipient telephone number assigned to the WGC 16 (FIG. 1).

Once the SMSC 14 receives the SM, it forwards the message (block 30) to its intended recipient WGC 16 based on the recipient telephone number associated with the short message.

In operation 32, the WGC decodes the content of the SM according to its game specific rules and queries the location of targeted subscriber B from the wireless network's location service center (LSC) 18. Such query would usually be performed in real-time, but depending on game-specific options, could also be performed after a specified delay. In one embodiment, the subscriber A may be able to specify the delivery time.

The SM contains as its content the game-specific information such as targeted subscriber address (ADDR_B), specified target location (LOC_X) and other game-specific options (e.g. delayed delivery, targeted or non-targeted "missile", evasion action, shields, etc.). In one example, the messages may be based on Internet Protocol. There may be SM length limitations depending on the underlying wireless technology used in the wireless network. It would be apparent to one skilled in the art that there may also be means for ensuring delivery to the WGC, means for prioritizing SM to the WGC in case of large amounts of SM traffic (or de-prioritizing SM to WGC, depending on operator policy).

The specified target location for the delivery of a "missile" may be defined in any one of several ways. As used herein, the term "missile" refers to a generic name for various types of weapon that may be used in a "shoot 'em up" type of game. For example, the intended specified target location may be described by its street address or latitudinal/longitudinal coordinates. Alternatively, some descriptive name of a location may be used corresponding to a particular cell site or location within a cell site. Furthermore, the missile may be a targeted offensive or defensive action (targeted to a narrow area) hereinafter referred to as a "bullet." Alternatively, the missile may be a non-targeted, or a targeted to a wider area offensive action hereinafter referred to as a "bomb."

In operation 34, the LSC 18 responds to the WGC 16 inquiry with LOC_B, the current location of subscriber B.

In operation 36, the WGC 16 compares LOC_B (the actual location of a game subscriber) with LOC_X (the subscriber specified target location for subscriber B), and takes game specific actions based on the result of the comparison. So if the result of the comparison is positive within tolerances of the location server's accuracy, WGC 16 may record a hit and inform both subscribers.

Alternatively, games having higher levels of complexity may include additional features such as defensive shields and/or evasive action options, and in these cases WGC 16 would have to take further steps after the initial comparison of LOC_B and LOC_X. Such actions may include updating a score and notifying subscriber B of the "incoming missile" according to the specific rules of the game, and notifying subscriber A of the results. For example, based on the game subscriber B's defense posture (e.g activated shields) the WGC 16 may register and report a "hit" or a "miss." The exceptional cases such as when subscriber B is out of the coverage area or when subscriber B is powered off are handled according to game-specific rules.

In another example, subscriber A may fire non-targeted "bombs" that may affect subscribers within a given radius of LOC_X as defined by subscriber A. In the case of a "bomb", the WGC 16 may query the LSC 18 for the location of all subscribers within a given radius of LOC_X (if the LSC 18 supports such an inquiry). A bomb as used herein refers to a non-targeted offensive or defensive gaming action that targets every subscriber within its range. WGC 16 would then generate game specific results based on the outcome of such a query and other game-specific rules. In one embodiment, the game subscriber A may further determine the type bomb or other weapons to use and/or select a given range of impact for the bomb.

In operation 38, WGC 16 may send a SM to SMSC 14 for subscriber B 22 with contents containing the game-specific notification to subscriber B 22 of subscriber A's actions. A similar message may be sent to subscriber A.

In operation 40, the SMSC 14 delivers each SM addressed to subscriber A and B to the appropriate party by the wireless network 12. In the alternative case of a bomb, the WGC 16 may generate a message for each of the game subscribers within the range of the bomb, to inform them of the game specific results.

In operation 42, the wireless network 12 delivers each message to its intended recipient.

Figure 3:
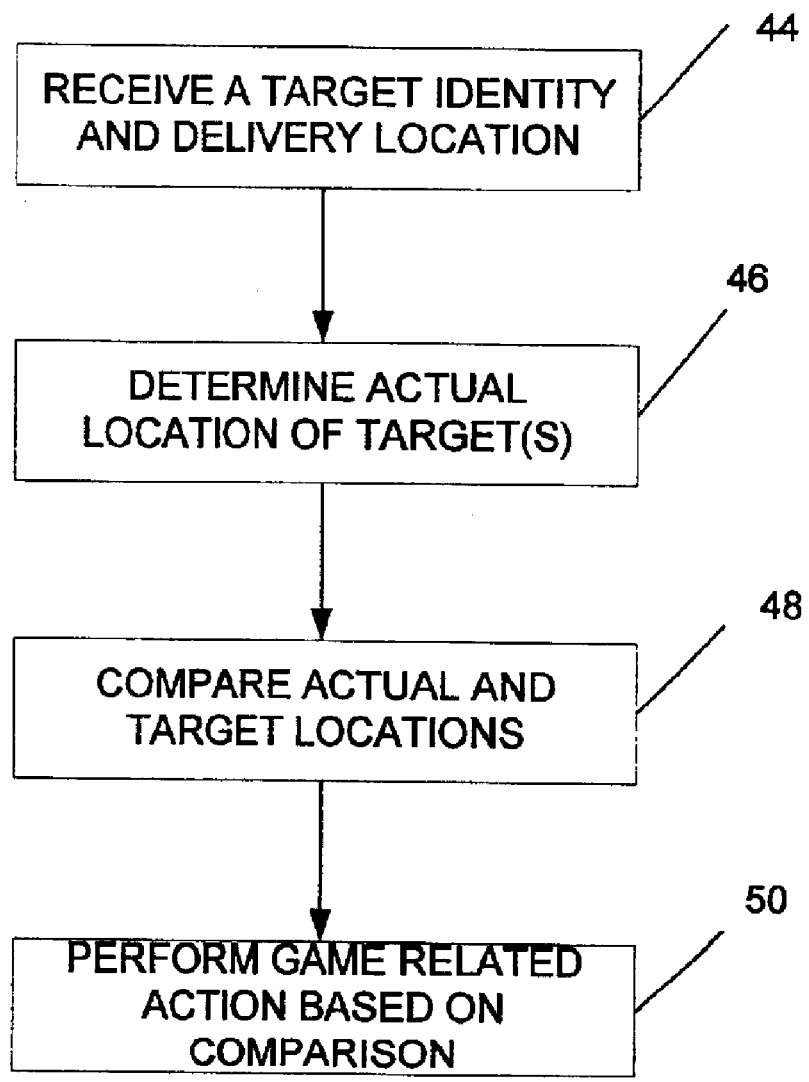
FIG. 3 is a flow chart illustrating operation of the wireless gaming center (WGC) in accordance an embodiment of the present invention.

FIG. 3 illustrates a block diagram of the operation of one embodiment of a wireless gaming center (WGC). As shown, the operation of the wireless gaming center (WGC) 16 begins at block 44 with receiving a target identity and a delivery location for a game related action from a first game subscriber, wherein the target identity corresponds to a second game subscriber. The wireless game may include additional layers of complexity allowing the subscriber A to further define game related parameters such as delivery time for the game related activity, types of offensive weapons to use, and the effective range of the offensive weapons.

At block 46, WGC 16 determines an actual location of the second game subscriber, subscriber B for example. In the example of a bomb, the location of all the game subscriber within a defined region in the vicinity of the bomb delivery location may be determined. Alternatively, only the identity of the subscribers within the effective range of the bomb may be ascertained. WGC 16 obtains this information by querying the LSC 18 for the actual location information.

At block 48, the WGC 16 compares the actual location of the second game subscriber to the delivery location. In the case of a bomb, WGC 16 identifies all the affected subscribers within the effective range of the bomb.

At block 50, WGC 16 performs game related actions based on the comparison of the delivery location to the location of the subscribers affected by it. Alternatively, the wireless game may include additional layers of complexity such as defensive shields on the part of the effected subscribers. The WGC 16 would interpret the effect of the delivery of a bullet, bomb or other offensive weapons based on the game rules and register the results accordingly. The game related actions may include notification of the various subscribers involved, by the WGC 16, by sending short messages via the SMSC 14 addressed to some or all of the affected subscribers.

In addition to the above mentioned examples, various other modifications and alterations of the inventive wireless gaming system may be made without departing from the invention. The above mentioned examples are used for the purpose of illustrating the innovative concepts of the present invention. Accordingly, the above disclosure is not to be considered as limiting and the appended claims are to be interpreted as encompassing the true spirit and the entire scope of the invention.

What is claimed is:

1. A method for providing interactive wireless gaming using standard wireless communication devices, wherein a plurality of subscribers participate in a wireless game by interacting with each other through a wireless gaming center, the method comprising:

(a) receiving at least an ordinate delivery location and a specified action in a short message for a chosen one of a plurality of game related actions from a first game subscriber;

(b) obtaining an actual location of at least a second game subscriber based on the last known location of the second game subscriber to a location service center;

(c) comparing the actual location to the delivery location; and (d) performing game related actions based on the comparison.

2. The method of claim 1 further comprising:

receiving a target identity corresponding to an identity of the second subscriber.

3. The method of claim 1 further comprising:

receiving a delivery time of the game related action from the first game subscriber.

4. The method of claim 1 wherein the actual location of the second game subscriber is determined by the location service center using land based communication between at least a second game subscriber cellular telephone device and the location service center.

5. A method for providing interactive wireless gaming using standard wireless communication devices, wherein a plurality of subscribers participate in a wireless game by interacting with each other through a wireless gaming center, the method comprising:

(a) receiving a target identity and a delivery location for a bullet from a first game subscriber in a short message, wherein the target identity corresponds to a second game subscriber;

(b) obtaining an actual location of the second game subscriber;

(c) comparing the actual location of the second game subscriber to the delivery location;

(d) recording a hit or a miss based on the results of the comparison and other game related rules; and (e) sending notifications through a short message to the first game subscriber and the second game subscriber informing of the results of the bullet.

6. The method of claim 5 further comprising:

receiving a delivery time of the bullet from the first game subscriber.

7. The method of claim 5 further comprising:

(a) receiving a target identity and a delivery location through a short message for a bomb from a first game subscriber, wherein the target identity is not defined;

(b) determining the plurality of game subscribers located within a defined range of the delivery location;

(c) recording a hit corresponding to a game subscriber based on his location and other game related rules; and (d) sending notifications to the first game subscriber and at least a subset of the plurality of game subscribers informing of the results of the bomb.

8. The method of claim 7 further wherein the range is defined by the first game subscriber.

9. An apparatus for providing interactive wireless gaming using standard wireless communication devices, wherein a plurality of subscribers participate in a wireless game by interacting with each other through a wireless gaming center, the apparatus comprising:

(a) a standard wireless communication device for transmitting a target identity and a delivery location for a game related action from a first game subscriber through a short message, wherein the target identity corresponds to a second game subscriber;

(b) a second standard wireless communication device for obtaining an actual location of the second game subscriber through a location service center;

(c) means for comparing the actual location of the second game subscriber to the delivery location; and (d) means for performing game related actions based on the comparison results.

10. An apparatus for providing interactive wireless gaming as defined in claim 9 further comprising means for transmitting a short message to the second subscriber notifying of a result of the game related action.

11. A wireless gaming system for providing interactive gaming, wherein a plurality of subscribers participate in a wireless game by interacting with each other, the system comprising:

(a) a wireless gaming network providing wireless communications between a plurality of wireless gaming subscribers through standard wireless communication devices;

(b) a short message service center for processing short messages over the wireless gaming network;

(c) a wireless gaming center for performing game related functions, wherein the wireless gaming center interacts with the wireless gaming network through short messages; and (d) a location service center for providing game subscriber locations to the wireless gaming center.

12. A computer program product embodied in a computer readable medium for providing interactive wireless gaming using standard wireless communication devices, wherein a plurality of subscribers participate in a wireless game by interacting with each other through a wireless gaming center, comprising:

(a) code means for receiving a target identity and a delivery location for one of a plurality of game related actions from a first game subscriber from a first standard wireless communication device through a short message, wherein the target identity corresponds to a second game subscriber;

(b) code means for obtaining an actual location of the second game subscriber from a second standard wireless communication device through a location service center;

(c) code means for comparing the actual location of the second game subscriber to the delivery location; and (d) code means for performing game related actions based on the comparison.

13. The computer program product of claim 12 further comprising:

code means for receiving a delivery time of the game related action from the first game subscriber.

* * * * *